(12) United States Patent
Congdon

(10) Patent No.: X3829
(45) Date of Patent: Mar. 12, 1824

(54) COTTON, MANUFACTURE

(76) Inventor: Elisha Congdon

Elisha Congdon
Letters Patent.

The schedule referred to in these Letters Patent and making part of the same containing a description in the words of the said Elisha Congdon himself of his improvement in the process of manufacturing Cotton In the process of Manufacturing Cotton, after the cotton has been passed through the picker. It is then weighed into parcels of such weight as is necessary to form a batt of proper thickness to make the roping of such size as may be wanted; each one of these parcels is of the proper size to make what is called a batt; in which process the cotton so weighed is fed on to an apron on the back side of the breaker and from thence passed through the breaker, and completed on what is called the batt cylinder on the other side.

It is of the utmost consequence that these batts should be uniform and equal, each one of the same length and weight. When the cotton for a batt has been wound on the batt cylinder by the operation of the breaker card, the batt is taken from the cylinder by a child employed for that purpose, by taking it on the sides, with each hand and tearing it apart; which operation makes the ends of the batts so torn, unequal, and also stretches the batts more or less in length; the consequences of which are, unequal yarn is produced from batts to be taken off. To obviate which difficulties, and also to save a very considerable portion of the labour usually bestowed, is the object and purpose of Congdon's Batt Breaker; by the construction of which, when ever the cotton which has been weighed and placed in the aprons & from thence has been run into the breaker, and discharged itself, on the batt cylinder, The batt is then broken by the bursting of the door, on the cylinder, constructed for that purpose, <u>The process of breaking the batt by Congdons Batt Breaker</u>, The cotton being spread on a cloth attached to a wooden roller about 2½ inches in diameter, lettered I, the cloth being sufficiently long to receive the cotton (this may be varied according to the weight of the batt wanted,) it is then wound upon the roller, and placed on two stands, A. fastened to the end of the
feeding frame, which stands [illegible] hung upon a pivot A, and the end of the cloth
or apron is then passed between two wooden rollers placed directly back of the
iron fluted rollers, which are also attached to the feeding frame; which rol-
lers revolve fast enough to unwind the lap cloth; and pass the cotton into the
card, when the cloth is unwound it moves those stands A that the batt roller
is placed on, forward, and raises the lever B, which is also connected to the feed
ing frame, which by the aid of this lap cloth it draws through those wooden
rollers that are placed back of the iron fluted rollers out of geer; and these
rollers being attached to one end of the rod C, passing along the side of the
card to the Batt cylinder or front of the machine. On the other end of this
rod is attached a knee D, which knee is fastened to the callender roll
stand, which by those two wooden rollers coming out of geer brings the
knee D. in contact with a spring catch E, which is placed on the head
of the batt cylinder, and holds the lid F, down that breaks the batt
when this knee comes in contact with a pin G placed in the spring
catch; this spring being crowded off, allows the spring H, placed on
the end of the cylinder to open the lid F and break the batt.
[illegible] lid is shut by passing an inclined plane placed on the post of
the card, — K is a spring that throws the wooden rollers out of geer
when ever the cotton is expended which has been placed on the apron
(and is also attached to the feeding frame;) Is is an instrument by which
the rollers are thrown into geer, when a new apron with cotton is put
into the stand A, which instrument Is is also attached to the feeding
frame M. is a spring which operates on the lever B, and forces it up
while the cotton is running into the card, and is also attached to the
feeding frame, (This machine not only breaks the batts more correctly
than they can be broken by hand, but has other advantages in breaking the
batts by water, In breaking by hand it is attended with several difficulties
the most important ones are; when a child has spread the batts in the usual
way on the back side of the machine, it will neglect to give notice that the
bat is out; and in consequence of this neglect the whole or part of two
batts, will run through the machine and consequently vary the number of the yarn considerably. When the batts in this machine are run through, the machine stops and breaks of itself, and it is impossible to make with it what is termed double batts; this is attended with great and serious injury in manu-facturing, and it is wholly impossible to make a child do this kind of work, without its making double batts more or less every day.

In consequence of its breaking by machinery, it does away all small help, and obviates this difficulty. The same work done by seven & eight children is now done by this machine, and one small boy is capable of tending ten breakers, and may be safely calculated to save one half the labour in preparing it to pass into the finisher. This machine is easy in its movements, simple in its construction, and correct in its Operation City of Norwich, March 1st 1824.

Elisha Congdon.

Witnesses

John D. Witt

James B. Goddard

Exd.
Ch.g.W.

[illegible]

2—328 a.

DRAFTSMAN'S DIVISION.

*All communications should be addressed to "The Commissioner of Patents, Washington, D. C."*

*DEPARTMENT OF THE INTERIOR,*

United States Patent Office,

*Washington, D. C.,* ........................, *189*...

*SIR:*

*The printed* ......copies...... *of Patent No.* E Congdon [illegible] Mar 12, 1824

......are...... *exhausted.*

*As soon as printed a copy will be mailed you to complete your order.*

...............................................................

...............................................................

*By direction of the Commissioner:*

*Very respectfully,*

...............................................................

*Chief Clerk.*

...............................................................

...............................................................

...............................................................

814316-97-5m